United States Patent

[11] 3,555,956

[72] Inventor Daniel W. Martin
Cincinnati, Ohio
[21] Appl. No. 751,521
[22] Filed Aug. 9, 1968
[45] Patented Jan. 19, 1971
[73] Assignee D. H. Bladwin Company
Cincinnati, Ohio
a corporation of Ohio

[54] ACOUSTO-ELECTRICAL TRANSDUCER FOR WIND INSTRUMENT
12 Claims, 10 Drawing Figs.
[52] U.S. Cl. ...................................... 84/400, 84/453
[51] Int. Cl. .................................... G10d 9/06
[50] Field of Search .......................... 84/453; 181/34, 33.4; 179/188; 84/400

[56] References Cited
UNITED STATES PATENTS
1,419,606  6/1922  Benedict ............... 181/34
1,563,586  12/1925  Pierman et al. ............... 181/34
2,536,261  1/1951  Caldwall, Jr. ............... 179/188
2,618,191  11/1952  Martin ............... 84/453
2,318,535  5/1943  Spivak ............... 84/400
2,571,809  10/1951  Altosino ............... 84/400

Primary Examiner—Stephen J. Tomsky
Attorney—Hurvitz, Rose and Greene

ABSTRACT: The bell of a brass wind instrument emits sound into a first enclosure providing, at the bell, a relatively small open cavity containing a microphone, the remainder of the enclosure being filled with highly absorptive acoustical material. A highly resistive or absorptive long and narrow acoustical path exists around the outside of the first enclosure, extending from the small open front cavity to a rear opening to the atmosphere, and is formed by a second enclosure spaced from and surrounding the first enclosure.

PATENTED JAN 19 1971 3,555,956
SHEET 1 OF 2
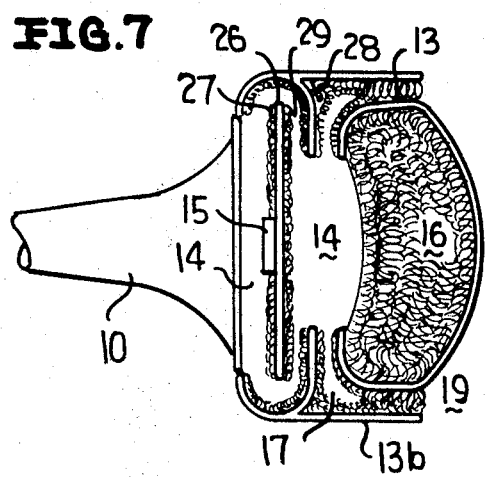
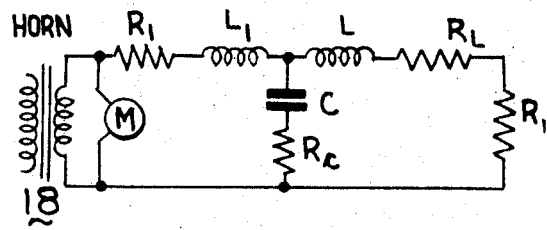
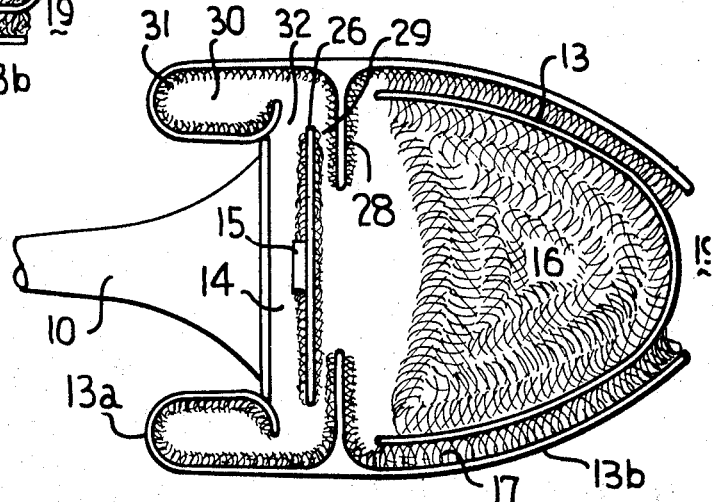
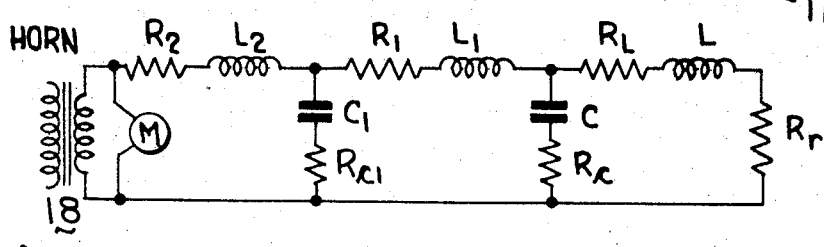
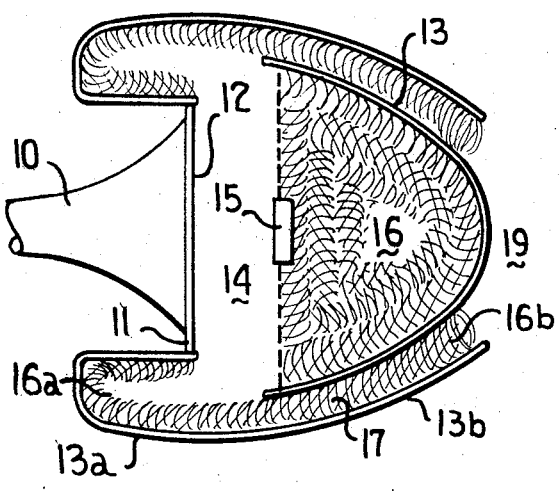
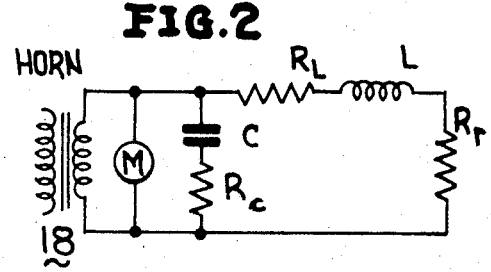
INVENTOR
DANIEL W. MARTIN
ATTORNEYS

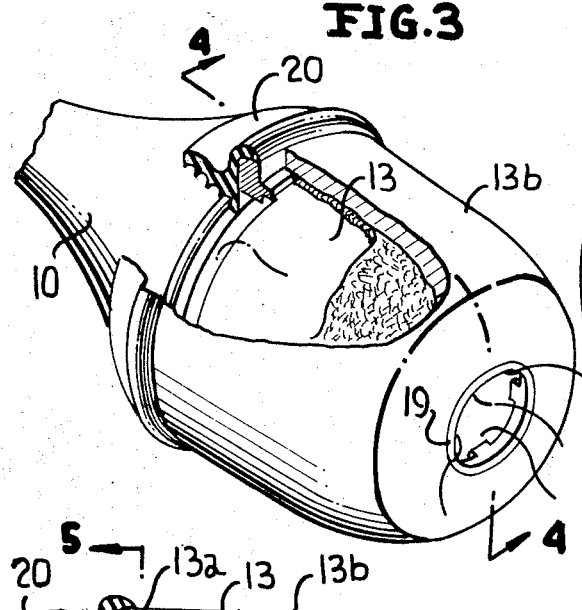
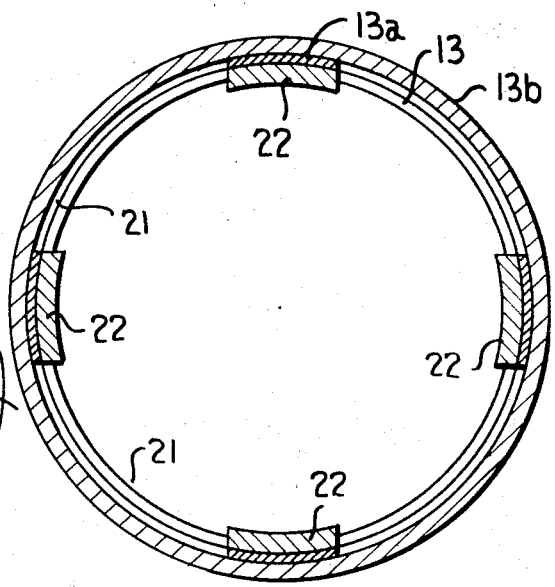
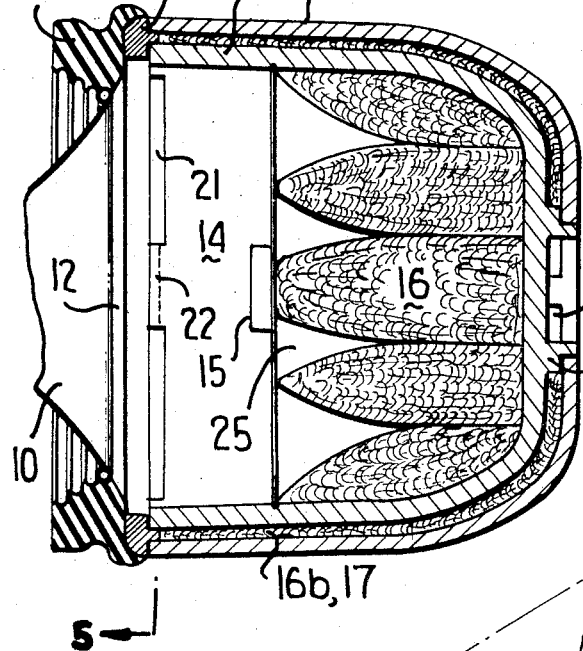
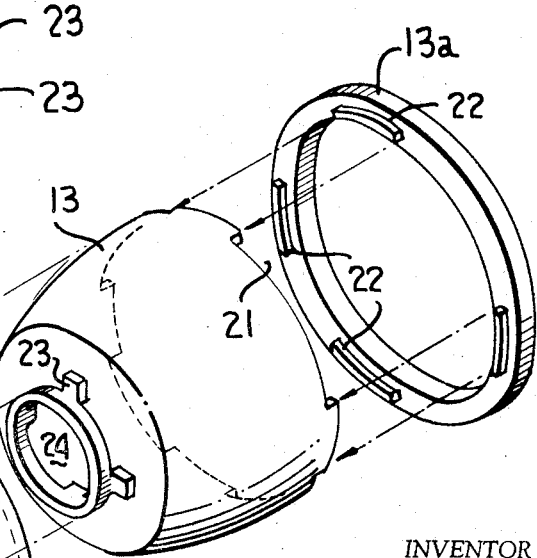
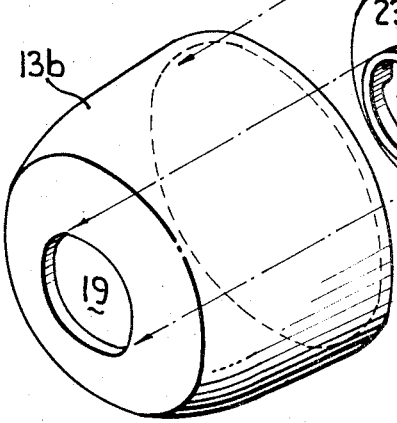

3,555,956

ACOUSTO-ELECTRICAL TRANSDUCER FOR WIND INSTRUMENT

BACKGROUND OF THE INVENTION

It is known to mute a brass wind instrument, such as a trumpet. Among the many mutes which are commonly employed, most provide a relatively low degree of muting, and in the process of muting change the timbre or tonal character of the instrument, and also change the reaction or the "feel" of the instrument at the player's lips. It is desirable to provide a mute which does not substantially modify timbre or pitch, which is capable of attenuating nearly 100percent, and which, to the lips of the player, has the "feel" of an unmuted horn. Such a mute would have value in practicing the instrument quietly and provision of this capability is a subsidiary object of this invention.

It is additionally known to mount an acoustoelectric transducer near the bell of a trumpet or the like, and to amplify the natural instrument tone to a variable degree. By restricting the tonal output of the instrument to an acoustically satisfactory space containing the microphone it is possible to reproduce the natural tone at both softer and louder levels than usual, which is another object of the invention. It is also known to electrically process the electrical output of the transducer, so as to modify reproduced timbre quite extensively, and even the pitch. The timbre processing technique employed is commonly employed in electric organs, and involves the use of filters, sometimes called tone color filters and sometimes formant filters. Frequency dividers and multipliers can be used for pitch change. In tone processing the output of a wind instrument, it is essential to mute, entirely or nearly so, the direct sound output, since otherwise the direct output of normal timbre and pitch would compete with the loudspeaker output, modified in timbre or pitch or both. This objective can be accomplished according to the present invention. A microphone is mounted near the bell opening of the instrument, within the mute of the present invention, in a small acoustically free space which is directly coupled to an acoustically absorptive space which essentially eliminates standing waves within the mute, and to a damped acoustical circuit which largely reduces any abnormal acoustical backloading on the instrument.

Thereby, the microphone is directly coupled through air to the air column of the trumpet, but most of the horn output passing the microphone is absorbed within the mute by the large mass of absorptive material. Reflections from the mute back into the horn are largely eliminated, so that to the lips of the player of the instrument, the latter seems to be radiating freely into the atmosphere and the timbre and pitch of the instrument output at the microphone are not materially affected.

It is requisite that the DC air flow from the wind instrument escape, but that the escape path provide a practical minimum transmission path for audible acoustic waves from the horn of the wind instrument to the surrounding atmosphere. When the invention is used only as a mute some acoustic transfer is required so that the player can hear the sound of his instrument at reduced level. A path of the desired characteristics is provided, in accordance with the present invention, along the outside of the primary enclosure above referred to, by providing a secondary enclosure which surrounds the primary enclosure but is slightly spaced therefrom to provide a path to atmosphere which is acoustically highly resistive and inductive. The path then can act as a low-pass filter. It is relatively free of acoustical resonances which could interact with the resonances of the horn itself in the fundamental pitch range of the instrument. The mute resonances are thoroughly damped acoustically, but the sudden change in cross section at the horn bell is retained allowing instrument resonances to be maintained. Direct radiation of sound from the bell opening to the atmosphere must then proceed via a double wall, doubly acoustically insulated and therefore the direct wound is greatly attenuated. Heavy, rigid walls would give greatest attenuation, but they are impractically heavy for a device mounted on the end of a horn. Experiments have shown that the enclosures referred to may even be fabricated of polystyrene foam, for lightness coupled with the requisite rigidity, yielding a sound power transmission loss more than 100 to 1 or 20 db.

A Pat. to D. W. Martin, U.S. Pat. No. 2,618,191, issued Nov. 18, 1952, teaches the primary concept of directing the sound of a trumpet into an acoustically dead space, having an egress path for DC air flow. The present invention is an improvement over the Martin patent primarily in that a double-walled enclosure is employed; the inner enclosure space is almost filled with efficient acoustical absorption material; the space between the walls is also highly acoustically absorbent and serving also as a long and narrow egress path for direct air slow. This combination yields a low-pass acoustic filter of high resistance and reactance. It is then found that an improvement in performance over the structure of the Martin patent can be obtained, while employing a volume only a few percent of that required by the latter. The resulting structure is sufficiently small and light that it can be easily carried on the trumpet, and need not be a stationary structure.

SUMMARY OF THE INVENTION

The invention relates to a double-walled mute for a brass wind instrument, such as a trumpet, horn, or the like, which mutes sound without radically affecting the musical characteristics of the instrument, or affecting the playing characteristics of the instrument as sensed by the player. DC air flow is vented via a long, narrow absorptive path in the space between the walls. A microphone may be installed within the sound chamber.

BRIEF DESCRIPTION OF THE DRAWINGS

FIG. 1 is a view in longitudinal cross section of an embodiment of the invention;

FIG. 2 is schematic circuit diagram representing the electrical equivalent of the acoustic circuits of the embodiment of FIG. 1;

FIG. 3 is a view in perspective of a further modification of the invention;

FIG. 4 is a view in longitudinal section, taken on the line 4-4 of FIG. 3;

FIG. 5 is a view in transverse cross section taken on the line 5-5 of FIG. 4;

FIG. 6 is an exploded view of FIG. 3; in perspective;

FIG. 7 is a view in longitudinal cross section of a further embodiment of the invention;

FIG. 8 is a schematic circuit diagram representing the electrical equivalent of the acoustic circuit of FIG. 7;

FIG. 9 is a view in longitudinal cross section of still another embodiment of the invention; and FIG. 10 is a schematic circuit diagram representing the electrical equivalent of the acoustic circuit of FIG. 9.

DESCRIPTION OF THE PREFERRED EMBODIMENTS

In FIG. 1, 10 is the bell portion of a trumpet, taken as representative of a brass wind instrument. The rim 11 of the bell 10 is secured tightly over an opening 12 to a hollow enclosure bounded by walls 13 and 13a fabricated of rigid but lightweight material. Within the enclosure is provided a small space 14, communicating directly with opening 12, and which is empty except for the presence of a very small microphone 15 in the form of a piezoelectric transducer preferably barium titanate. Filling the remainder of the enclosure, exclusive of open space 14, are masses 16 and 16a of highly absorptive material. The microphone 15, the horn 10 and the opening 12 are preferably coaxial.

The immediate vicinity of the bell rim 11 is uncluttered so that normal open end reflection back into the air column occurs, sustaining tone oscillation in the usual manner. The acoustic waves leaving the trumpet penetrate into the mass 16 of absorptive material and are not reflected appreciably to the bell. The space 14 coupled to the mass of material 16 then appears to the horn essentially as would the atmosphere, were the instrument being played without a mute. This is important to the player. The presence of open space 14 aNd the acoustic permeability and absorptive capability of mass 16 assure that the acoustical (AC) output of the instrument issues into a space closely simulating free atmosphere. However, it is also necessary to provide an escape passage 17 for DC air flow, in order to assure that the mean air pressure in the space 14 is nearly equal to atmospheric during playing. The manner of accomplishing this is described hereinafter.

Playing tests by instrumentalists indicate that the presence of the mute of the present invention has very little effect upon the player's lip vibrations or upon the air pressure required to play. The sound radiates chiefly into the absorptive material enclosed within the relatively rigid walls 13 and 13a of the enclosure. This differs from the broad teaching of U. S. Pat. No. 2,618,191, to Martin wherein the sound radiated into a large enclosure with boundaries thinly coated with absorptive material.

According to the present invention, the enclosure 13 is surrounded by an extension 13b of wall 13a which is spaced at substantially all points from wall 13, the intervening space 17 being filled with acoustic absorbing material 16b. The packing density should be heavy enough to attenuate sound waves (AC) and light enough to prevent noticeable back pressure (DC). Therefore, most of the direct acoustic path between the horn 10 and the atmosphere is interrupted by two relatively rigid walls 13 and 13b, and by two masses 16 and 16b of absorptive material. Any tendency for vibratile action by walls 13 and 13b is inhibited by the mechanical damping action of materials 16 and 16b. Transmission through the structure is therefore smaller by a major factor than in the case of the Martin patent, supra, in spite of greatly reduced mass.

FIG. 2 is an equivalent electrical circuit of the acoustical circuit of FIG. 1. Horn 10 is analogous to transformer 18. The air current (both DC and AC) to radiation resistance $R_r$ of hole 19 to the atmosphere flows through annular passage 17 between wall 13 and wall 13b, which is filled with acoustically absorptive material 16b. This path is relatively long and narrow, and acts acoustically as a high resistance $R_L$ in series with inductance L. Absorptive material 16 and 16a act acoustically as resistance $R_c$ in series with the acoustical capacitance C of the space enclosed within 13 and 13a. Voltmeter M is the electrical analogue of pressure microphone 15.

The double-wall structure has a double function. Firstly, it provides increased attenuation of the output of the bell directly through the walls of the mute, almost doubling the attenuation for a single-walled structure. Secondly, the space between the walls provides a resistive path for DC acoustic flow and a much higher acoustic impedance at tone frequencies, because of the presence of equivalent acoustic inductance in the interwall path. The damped enclosed space and the damped double-wall passage operate acoustically as a low-pass filter. It is found that the physical dimensions of the mute of the present invention can be such that there are few resonances within the playing range of a trumpet and any of these are highly damped.

A practical embodiment is shown in perspective in FIG. 3, in longitudinal section in FIG. 4, in cross section in FIG. 5, and in three-part, axially exploded perspective in FIG. 6. In this embodiment it was found practical to omit absorptive material 16a and the space enclosing it, reducing the values of C and $R_c$. A total length of about seven inches is adequate and a diameter of less than 7 inches. By fabricating the walls of very light, plastic material (which is itself acoustically dead) the mute can be mounted directly on the horn without presenting an unacceptable dead weight to the player. The total mass, including the microphone, approximates that of conventional cup mutes fabricated of spun aluminum.

The acoustical isolation provided by the mute is bilateral, so that the microphone is not subject to acoustical feedback from loudspeakers which are in turn driven from the microphone, a distinct advantage in any amplification system.

Because the enclosure is more highly absorbent and much smaller relative to wave lengths in the playing range of frequencies, the precise shapes of the walls 13 and 13b are not critical and the irregularities and assymmetries required in U.S. Pat. No. 2,618,191 are no longer so important.

In FIG. 4, the bell 10 is secured within socket 20 cemented to front wall 13a of enclosing wall 13, covering opening 12. The contour of socket 20 and front wall 13a immediately adjacent to the bell 10 extends at or nearly at 90° to the axis of the bell, and the diameter of the enclosure 13 is considerably greater than the diameter of the bell. This consideration has been discussed in the Martin patent and assures that the instrument has the same pitch with the mute installed and without it. To accomplish this end, the mute must not appear to the horn as an extension of itself, which many mute designs of the past have done.

In order to support both enclosing walls 13 and 13b upon front wall 13a, it is necessary to have slot openings 21 between the edges of front wall 13a and enclosing wall 13, leading to passage 17 spaced therefrom and the spaces filled between the enclosing walls and partially filled with fibrous acoustic attenuating material 16. This structure is double walled, as in FIG. 1, but the walls have mechanical connections 22 between the slots 21 for DC air flow. The DC air flow path and the acoustic path have higher resistance in FIG. 4 than in FIG. 1, but the principles involved in the devices are essentially the same.

Enclosing walls 13 and 13a may also be joined by mechanical connections 23, for structural integrity at the back end, as long as slots 24 are provided from passage 17 to opening 19.

It is possible to shape the mass of absorptive material 16, as in FIG. 4, to decrease its reflectivity. This may be accomplished by forming the mass to look to the bell like a group of inverse exponential horns 25, which provide a better acoustical impedance match and, consequently, even less sound reflection to the bell of the horn.

The omission of inner wall 13, leaving a single-walled structure, retains some utility, although this results in an increase in sound transmission of about 10 db. The double-walled structure with sufficiently rigid walls can provide an attenuation of over 30 db. In the single-walled structure some advantage is still achieved through the use of a large volume of fibrous acoustic attenuating material within the open cavity containing the microphone, and acoustically in series with a tortuous DC leakage path near opening 19 to the atmosphere.

In FIG. 7 baffle 26 bearing microphone 15 and covered with acoustically absorbent material 27 has been inserted into the acoustical system, creating with baffle 28 an additional passageway segment 29 leading to space 14. This adds new elements, inductance $L_1$, and the associated lined passageway resistance $R_1$, to the analogous electrical circuit, as shown in FIG. 8, reducing further the sound transmission to the radiation resistance $R_r$ at the atmosphere.

In FIG. 9 space 30 with absorbent lining 31 branches off from the middle of the passageway around baffle 26, creating passageway segment 32 in addition to remaining passageway segment 29. Thus new elements $C_1$ and $L_2$ and their associated resistors $R_{cl}$ and $R_2$, respectively, are added to the equivalent electrical circuit of FIG. 10. This provides an additional low-pass filter section for greater attenuation of high-frequency sound radiated at opening 19. While this additional construction adds to cost, weight, and the labor of construction, it may be justified when maximum horn attenuation is desired.

I claim:

1. An attachment for a brass wind instrument, comprising a housing defining a chamber closable by the rim of the instrument bell when the bell opening is connected to an opening in said housing into said chamber, a mass of acoustically absorbing material largely filling said chamber, but absent from the immediate area of attachment of said bell to said housing to define an open space directly coupled to said large mass of acoustically absorptive material, whereby said instrument radiates sound directly into said small open space and means defining a long narrow highly acoustically absorptive passage, filed with acoustically absorptive material proceeding from said small open space and surrounding said chamber and having a terminating opening to the surrounding atmosphere.

2. The combination according to claim 1 wherein a microphone is mounted in said small open space.

3. In combination with a wind instrument having a sound emitting bell portion, a housing defining a substantially closed highly acoustically absorptive space coupled closely to said horn and capable of absorbing acoustic output from said horn, and means defining a long, narrow, highly acoustically attenuating path leading from adjacent the conjunction of said horn and said space to the surrounding atmosphere for transmitting air flow of said instrument to said surrounding atmosphere to maintain ambient pressure in said space.

4. The combination according to claim 3 wherein a microphone is mounted in said closed space.

5. The combination according to claim 3 wherein said housing is cylindrical and coaxial with said bell.

6. The combination according to claim 4 wherein said microphone is mounted coaxially of said bell.

7. The combination according to claim 5 wherein is provided a small open space within said chamber coupling said horn to said absorptive space.

8. The combination according to claim 5 wherein said narrow, highly attenuating path is defined by a cylindrical structure substantially surrounding said housing but spaced therefrom.

9. A double-walled muffler for a brass wind instrument, comprising means providing a path from said instrument to the atmosphere via the space between said walls, and a mass of acoustic attenuating material in said space, said mass of acoustic attenuating material being arranged to pass air flow from said instrument to the atmosphere at a rate to maintain ambient pressure in said space.

10. A double walled muffler for a brass wind instrument comprising spaced apart acoustical enclosures and a mass of fibrous acoustic material in the inner one of said enclosures, and an air flow path having high acoustic impedance extending in at least one of said enclosures from the sound emitting region of the instrument to the atmosphere.

11. A muffler for a brass wind instrument, comprising an enclosure having an opening capable of mating with the bell of the instrument, an unencumbered region encompassed in a minor portion of said enclosure located immediately at said opening, the remainder of said enclosure being packed with fibrous acoustically attenuating material, and means defining an egress path extending from said unencumbered region for air flow from said enclosure, said egress path having a high acoustic impedance.

12. The combination according to claim 11 wherein a microphone is located in said unencumbered region.